(12) United States Patent
Nori et al.

(10) Patent No.: US 12,175,347 B2
(45) Date of Patent: *Dec. 24, 2024

(54) NEURAL TREES (71) Applicant: Microsoft Technology Licensing, LLC, Redmond, WA (US)

(72) Inventors: Aditya Vithal Nori, Cambridge (GB); Antonio Criminisi, Cambridge (GB); Ryutaro Tanno, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,888

(22) Filed: Apr. 25, 2023

(65) Prior Publication Data

US 2023/0267381 A1  Aug. 24, 2023

Related U.S. Application Data (63) Continuation of application No. 16/043,131, filed on Jul. 23, 2018.

(30) Foreign Application Priority Data

Jun. 29, 2018  (GB) ...................... 1810736

(51) Int. Cl.
*G06N 20/20*  (2019.01)
*G06F 17/18*  (2006.01)
(Continued)

(52) U.S. Cl.
CPC ............. *G06N 20/20* (2019.01); *G06F 17/18* (2013.01); *G06F 18/24323* (2023.01);
(Continued)

(58) Field of Classification Search
CPC ................. G06F 17/18; G06F 18/2413; G06F 18/24323; G06N 20/20; G06N 3/04; G06N 3/042; G06N 3/045; G06N 3/048; G06N 3/082; G06N 3/084; G06N 5/01; G06N 5/022; G06V 10/454; G06V 10/764; G06V 10/82

See application file for complete search history.

(56) References Cited

PUBLICATIONS

Xiao et al., "NDT: Neual Decision Tree Towards Fully Functioned Neural Graph", Dec. 16, 2017, arXiv:1712.05934v1, pp. 1-8. (Year : 2017).*

(Continued)

*Primary Examiner* — Brent Johnston Hoover
(74) *Attorney, Agent, or Firm* — Barta Jones, PLLC (57) ABSTRACT A predictor has a memory which stores at least one example for which an associated outcome is not known. The memory stores at least one decision tree comprising a plurality of nodes connected by edges, the nodes comprising a root node, internal nodes and leaf nodes. Individual ones of the nodes and individual ones of the edges each have an assigned module, comprising parameterized, differentiable operations, such that for each of the internal nodes the module computes a binary outcome for selecting a child node of the internal node. The predictor has a processor configured to compute the prediction by processing the example using a plurality of the differentiable operations selected according to a path through the tree from the root node to a leaf node.

20 Claims, 7 Drawing Sheets

(51) Int. Cl.
*G06F 18/243* (2023.01)
*G06N 3/04* (2023.01)
*G06N 3/082* (2023.01)
*G06N 5/01* (2023.01)
*G06V 10/44* (2022.01)
*G06V 10/764* (2022.01)
*G06V 10/82* (2022.01)

(52) U.S. Cl.
CPC ............... *G06N 3/04* (2013.01); *G06N 3/082* (2013.01); *G06N 5/01* (2023.01); *G06V 10/454* (2022.01); *G06V 10/764* (2022.01); *G06V 10/82* (2022.01)

(56) References Cited

PUBLICATIONS

Dong et al., "GrCAN: Gradient Boost Convolutional Autoencoder with Neural Decision Forest", Jun. 24, 2018, Journal Oflatex Class Files, vol. 14, No. 8, pp. 1-12. (Year: 2018).*
Sankar et al., "Growing and Pruning Neural Tree Networks", Mar. 1993, IEEE Transactions on Computers, vol. 42, No. 3, pp. 291-299. (Year: 1993).*
"Office Action Issued in European Patent Application No. 19735078.8", Mailed Date: Apr. 5, 2023, 6 Pages.
EPO Notification Rule 71(3) received in European Application No. 19735078.8, mailed on Sep. 2, 2024, 7 pages.

* cited by examiner

NEURAL TREES

CROSS-REFERENCE TO RELATED APPLICATION

This application is a continuation application of and claims priority to U.S. patent application Ser. No. 16/043,131 entitled "NEURAL TREES," filed on Jul. 23, 2018, the disclosure of which is incorporated herein by reference in its entirety.

BACKGROUND

Neural networks are widely used today in many application domains such as face recognition, object recognition, medical image processing, gesture recognition, machine translation, speech recognition, text prediction and others. The predictions computed by such neural network technology are often highly accurate and in some cases perform at the same level or better than humans, such as in the case of medical image processing.

With the increasing use of neural network technology to compute predictions which are used for automated decision making, there is a growing need for interpretability of the technology. Often humans would like an explanation of how a particular decision was reached by an automated system.

Another consideration is the memory and processing requirements of neural network technology which are often significant. Where neural networks are to be stored on resource constrained devices such as smart phones and wearable computers, there is a need to try to reduce the memory and processing requirements involved. If a deep neural network is stored on a wearable computer and used to compute a prediction the computational work involved at the wearable computer can be significant and can impede the operation of other functions at the wearable computer as well as depleting power. As a result it can be difficult to deploy neural networks on resource constrained devices such as smart phones or embedded devices.

Large numbers of training examples are typically used to train neural networks in order to carry out classification tasks or regressions tasks. The training process is typically time consuming and resource intensive. There is a desire to reduce the amount of time, memory and processing resources needed for training neural network systems. For example, neural networks grow significantly with depth and so cannot be trained too deeply on computers with limited memory.

There is an ongoing need to improve the accuracy of neural network predictors and to improve generalization ability. Generalization ability is being able to accurately perform the task in question even for examples which are dissimilar to those used during training.

The embodiments described below are not limited to implementations which solve any or all of the disadvantages of known neural network technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a predictor for predicting an outcome given an example. The predictor has a memory which stores at least one example for which an associated outcome is not known. The memory stores at least one decision tree comprising a plurality of nodes connected by edges, the nodes comprising a root node, internal nodes and leaf nodes. Individual ones of the nodes and individual ones of the edges each have an assigned module, comprising parameterized, differentiable operations, such that for each of the internal nodes the module computes a binary outcome for selecting a child node of the internal node. The predictor has a processor configured to compute the prediction by processing the example using a plurality of the differentiable operations selected according to a path through the tree from the root node to a leaf node.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in an image processing system, the system described is provided as an example and not a limitation. As those skilled in the art will appreciate, the present examples are suitable for application in a variety of different types of image processing or machine learning systems. A machine learning system is one or more computing devices which has a stored representation describing knowledge about one or more examples, and which updates the stored representation in the light of observed examples.

Figure 1:
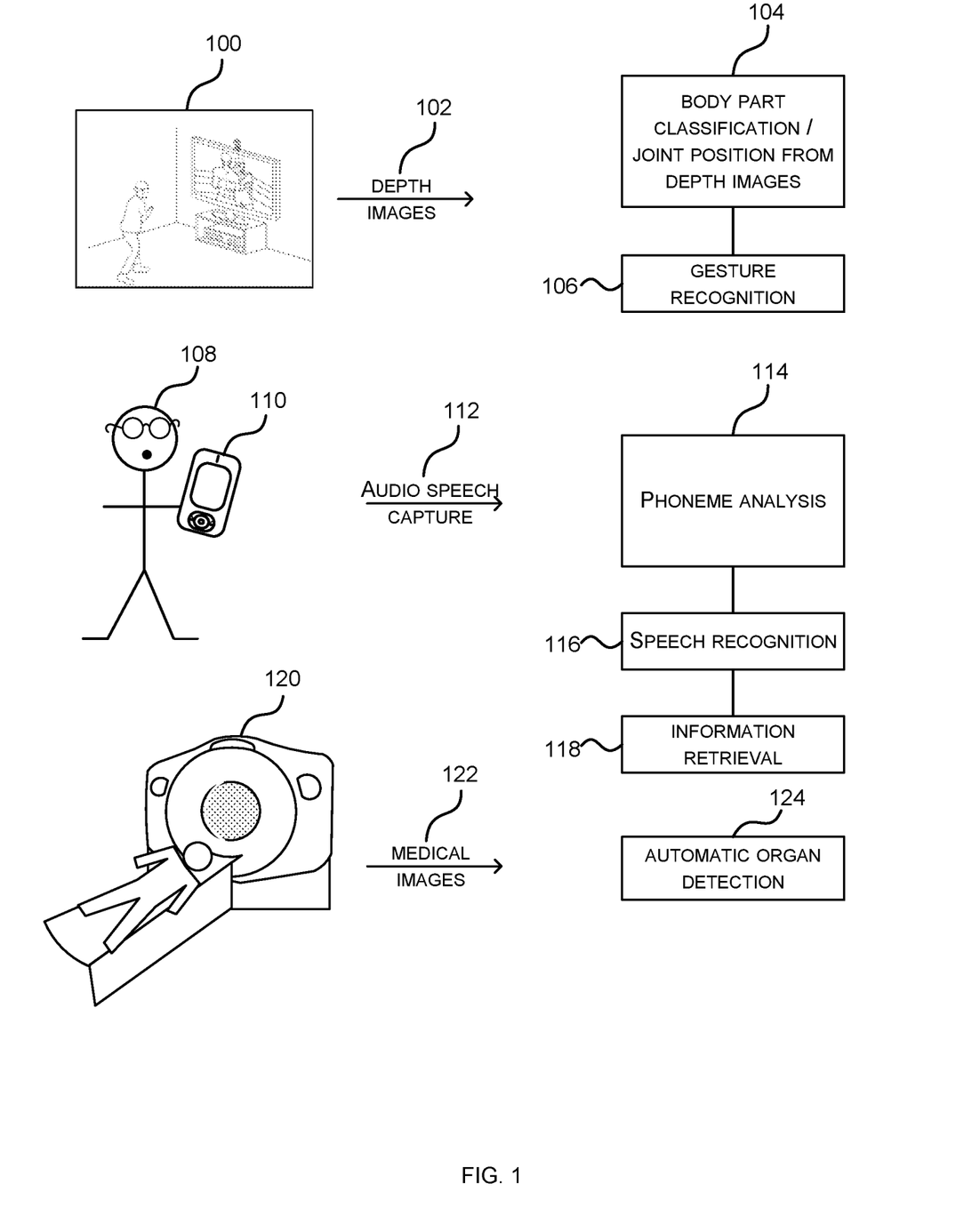
FIG. 1 is a schematic diagram of a plurality of different systems in which a machine learning system with one or more neural trees is used.

FIG. 1 is a schematic diagram of a plurality of systems in which a machine learning system with one or more neural trees. For example, a body part classification or joint position detection system 104 operating on depth images 102. The depth images may be from a natural user interface of a game device as illustrated at 100 or may be from other sources. The body part classification or joint position information may be used to calculate gesture recognition 106.

In another example, a person 108 with a smart phone 110 sends an audio recording of his or her captured speech 112 over a communications network to a machine learning system 114 that carries out phoneme analysis. The phonemes are input to a speech recognition system 116 which uses one or more neural trees. The speech recognition results are used for information retrieval 118. The information retrieval results may be returned to the smart phone 110.

In another example medical images 122 from a CT scanner 120, MRI apparatus or other device are used for automatic organ detection 124.

In the examples of FIG. 1 a machine learning system using one or more neural trees is used for classification or regression. This gives better accuracy and/or generalization performance as compared with previous systems using equivalent amounts of computing resources and training time. The systems are also workable where memory resources are limited such as on smart phones or embedded devices.

A neural tree is a plurality of nodes connected by edges to form a tree structure and where at least some of the nodes and edges each have an assigned module comprising parameterized, differentiable operations. As an example passes along a path through the neural tree from a root node of the tree to a leaf node, it is transformed according to the operations at the edges and nodes along the path. The modules are configured so that a sequence of modules along a path through the neural tree from the root node to a leaf node forms a neural network. That is, a module comprises operations which are operations carried out by one or more layers of a neural network.

The modules comprise routers, transformers and solvers. A router is a type of module assigned to an internal node of the neural tree and it computes a binary decision for routing samples from the incoming edge of the internal node to one of the child nodes of the internal node. A transformer is a type of module assigned to an edge in a neural tree and which computes a nonlinear function. An edge of a neural tree may have more than one transformer assigned to it. A solver is a type of module assigned to a leaf node of a neural tree. A solver receives input data from its incoming edge and it computes an estimate of a conditional distribution expressing the probability of an outcome y given an input x.

In various examples described herein, neural trees are described for supervised learning tasks, where the aim is to learn a conditional distribution p(y|x), which can be thought of as the probability of outcome y given input example x, from a set of N labelled samples $(x^{(1)}, y^{(1)}), \ldots, (x^{(N)}, y^{(N)}) \in \mathbb{R}^D \times \mathcal{Y}$ as training data.

A neural tree is defined formally as a tree-structured model, characterized by a set of hierarchical partitions of an input space $\chi$, a series of nonlinear transformations, and separate predictive models in the respective component regions. In particular, a neural tree is an ordered pair ($\mathbb{T}$, $\mathbb{O}$) where $\mathbb{T}$ defines the topology of the neural tree, and $\mathbb{O}$ denotes the set of operations on it (i.e. the modules assigned to the nodes and edges of the neural tree).

Figure 3:
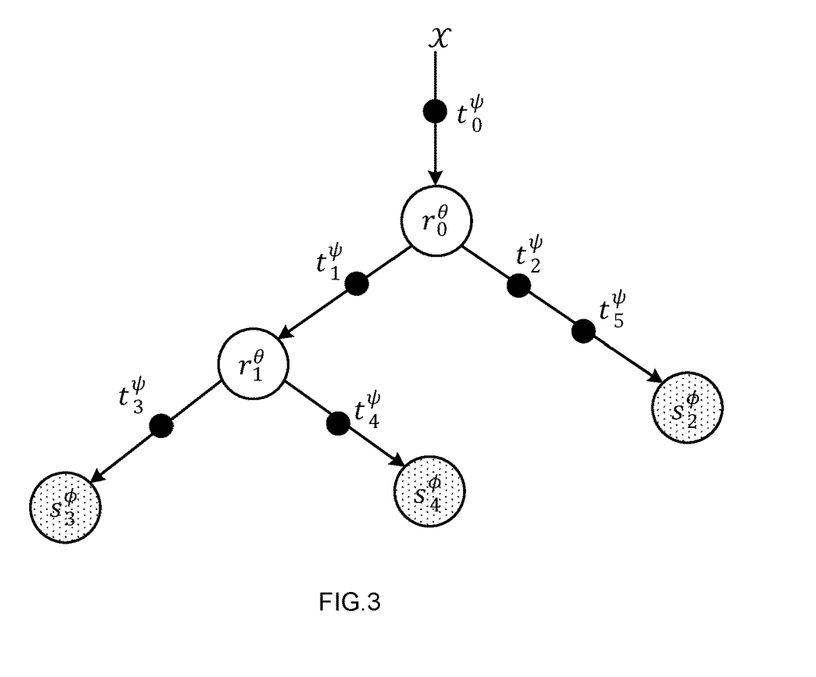
FIG. 3 is a schematic diagram of a neural tree.

In various examples described herein, the topology $\mathbb{T}$ comprises binary trees, defined as a set of finite graphs whose every node is either a leaf or an internal node, and every node is the child of exactly one parent node, except for a distinguished root node, which has no parent. The topology of a tree is an ordered set $\mathbb{T} = \{\mathcal{N}, \varepsilon\}$ where $\mathcal{N}$ is the set of nodes, and $\varepsilon$ is the set of edges between them. Nodes with no children (at the bottom of the tree) are called leaf nodes (denoted by leaves($\mathcal{N}$)), and others are called internal nodes. For every internal node j∈internals($\mathcal{N}$): = $\mathcal{N}$\leaves($\mathcal{N}$), there are exactly two children nodes, represented by left(j) and right(j). Unlike standard trees, $\varepsilon$ contains an edge which connects input data x with the root node, as shown in FIG. 3.

Individual ones of the nodes and edges are assigned with a module comprising an operation which acts on the allocated samples of data. Starting at the root, every sample gets transformed and traverses the tree according to the set of defined operations $\mathbb{O}$. Each tree is constructed based on three primitive modules of differentiable operations described below:

Routers, $\mathcal{R}$: an internal node j∈internals($\mathcal{N}$) holds a router module, $r_j^\theta: \chi_j \to [0,1] \in \mathcal{R}$, parametrised by θ, which decides to send samples from the incoming edge to the left or right child. Note that $\chi_j$ denotes representation at node j. Embodiments use stochastic routing here where its binary decision (1 for the left and 0 for the right branch) is sampled from Bernouli random variable with mean $r_j^\theta(x_j)$ for input $x_j \in \chi_j$. For example, $r_j^\theta$ can be defined as a small convolutional neural network (CNN).

Transformers, $\mathcal{T}$: an edge e∈ε of the tree has one or a composition of multiple transformer module(s). Each transformer $t_e^\psi \in \mathcal{T}$ is a non-linear function, parametrized by ψ, that transforms samples from the previous module and passes them to the next one. For example, $t_e^\psi$ can be a single convolutional layer followed by a rectified linear unit (ReLU). Unlike standard decision trees (DTs), edges are allowed to "grow" by adding more transformer operations as described later in this document.

Solvers, $\mathcal{S}$: a leaf node l∈leaves($\mathcal{N}$) is assigned to a solver module, $s_l^\phi: \chi_l \to \mathcal{Y} \in \mathcal{S}$, parametrized by φ, which operates on the transformed input data and outputs an estimate for the conditional distribution p(y|x). For example, in the case of classification, embodiments define the solver $s^\phi$ as a linear classifier on the feature space $\chi_l$, which outputs a probability distribution over target classes.

Defining operations on a neural tree expressed as a graph $\mathbb{T}$ amounts to a specification of the triplet $\mathbb{O} = (\mathcal{R}, \mathcal{T}, \mathcal{S})$. For example, given inputs from an image domain, the operations of each module ($\mathcal{R}, \mathcal{T}, \mathcal{S}$) are selected from a set of operations commonly used in convolutional neural networks CNNs. As a result, every computational path on the resultant neural tree is a CNN, and the set of routers that guide input to one of these paths are also given by convolutional neural networks (CNNs).

Figure 2:
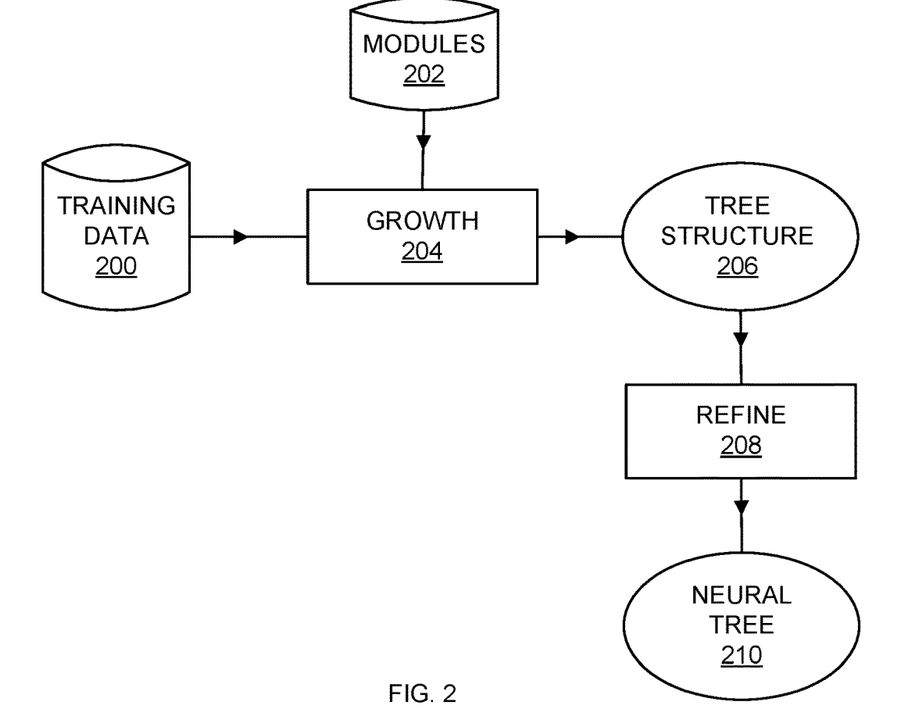
FIG. 2 is a schematic diagram of a processing pipeline for growing and training a neural tree.

FIG. 2 is a schematic diagram of a processing pipeline for growing and training a neural tree. Training data 200 is available from a store or other source. The training data comprises labelled examples, such as labelled images, labelled phonemes, labelled text, labelled skeletal features, or other labelled examples according to the task that the neural tree is to be used for.

During a growth phase a growth module 204 begins with an initial tree structure, and grows nodes and edges onto the initial tree structure as described in more detail with reference to FIGS. 4 and 5. Growth involves assigning modules 202 comprising parameterized, differentiable operations, to individual ones of the nodes and edges as they are grown onto the initial tree structure. The modules 202 are predefined and comprise primitive operations of a neural network. Growth continues until the tree structure reaches a threshold size and/or until convergence is reached.

The growth module 204 outputs a neural tree 206. Optionally the neural tree is refined 208 in order to prune branches which are redundant and so produce a final neural tree 210. The final neural tree is then deployed at a smart phone, wearable computer or other computing device by storing the parameters of the final neural tree at the computing device. In some cases the final neural tree is deployed in the cloud. The final neural tree is deployed together with a plurality of other neural trees in a neural forest in some cases.

By using the growth module it is possible to grow the topology of the neural tree so that it is bespoke to the particular training data. In contrast a neural network has an architecture which is pre-configured before training and is independent of the particular training data used. In this way the neural tree architecture is better suited to the particular task than a neural network and is typically smaller (fewer nodes) than a neural network used for the same task. The reduction in size brings efficiencies in terms of space needed to store the neural tree at a resource constrained device. The reduction in size also brings efficiencies in the amount of computing resources needed at test time inference.

FIG. 3 is a schematic diagram of a neural tree comprising a root node $r_0^\theta$, one internal node $r_1^\theta$, and three leaf nodes $s_2^\phi, s_3^\phi, s_4^\phi$. The root node $r_0^\theta$ has one incoming edge with a transformer module $t_0^\psi$ represented by a black circle on the incoming edge. An example x is transformed by transformer module $t_0^\psi$ before reaching the root node $r_0^\theta$. The root node $r_0^\theta$ has two outgoing edges, one with two transformers on it $t_2^\psi t_5^\psi$ which terminates at leaf node $s_2^\phi$, and one with a single transformer on it which terminates at the internal node $r_1^\theta$. The internal node $r_1^\theta$ has two outgoing edges each of which terminates in a leaf node $s_3^\phi, s_4^\phi$.

Figure 4:
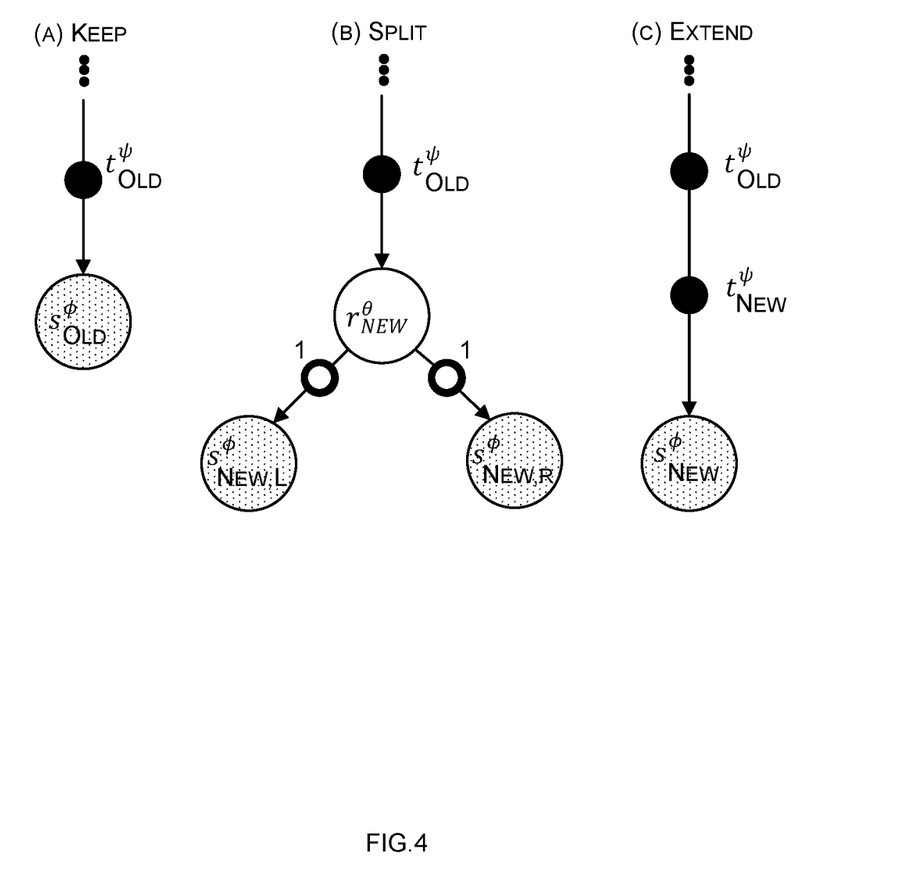
FIG. 4 is a schematic diagram of three branches of a neural tree.

FIG. 4 is a schematic diagram of three branches of a neural tree which illustrate three outcomes occurring during the growing process. According to outcome a "keep" in FIG. 4 the leaf node is unchanged so that the solver is as it was before the growing operation, and the transformer on the incoming edge is as it was before the growing operation. According to outcome b "split" in FIG. 4 an existing leaf node is split to create two new leaf nodes $s_{NEW,L}^\phi, s_{NEW,R}^\phi$. A new internal node is created denoted $r_{NEW}^\theta$ in FIG. 4. The transformer on the edge incoming to the new internal node is the same as for the transformer on the edge incoming to the original leaf node. The outgoing edges from the new internal node each have a transformer which is an identity transformer (i.e. a transformer which makes no change to the data it processes). According to outcome c "extend" in FIG. 4 an existing incoming edge to a leaf node is extended by adding another transformer $t_{NEW}^\psi$. Thus the incoming edge to the leaf node now has two transformers connected in series, which are the pre-existing transformer $t_{OLD}^\psi$ and the new transformer.

Figure 5:
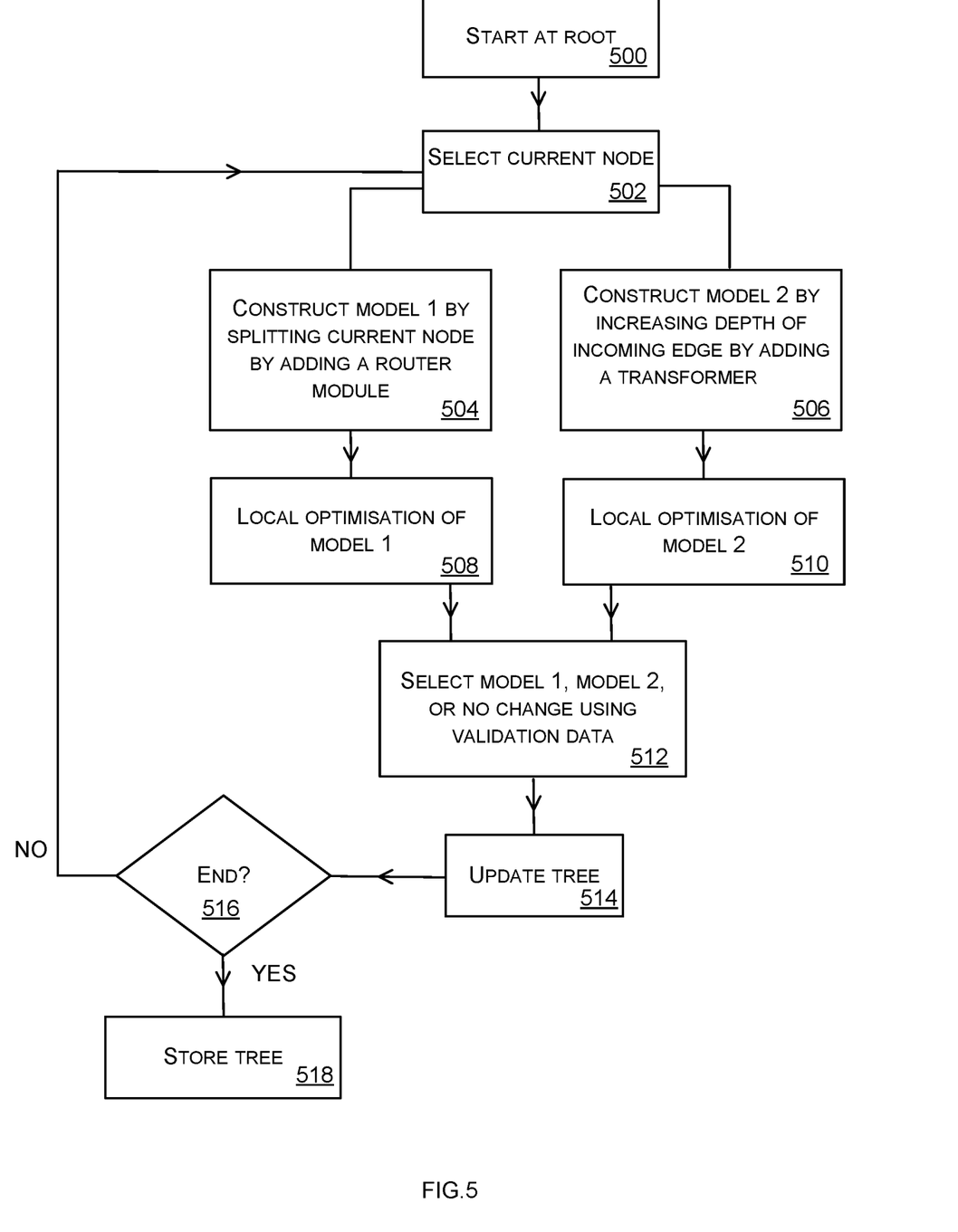
FIG. 5 is a flow diagram of a method of growing a neural tree.

More detail about the process carried out by the growth component 204 of FIG. 2 is now given with reference to FIG. 5. To grow a neural tree from scratch, the growth component starts 500 at a root node which it creates. It selects the current node, which is the root node in the case that there are no other nodes yet. If other nodes of the neural tree are present, the growth process proceeds to select a current node using a breadth-first strategy.

The growth component constructs two models, model one and model two, and it does this in parallel. Model one is constructed by simulating splitting 504 of the current node by adding a router module. The added router module is assigned to a new internal node as for the "split" situation of FIG. 4 described above. Model two is constructed by simulating increasing the depth of the incoming edge of the current node by adding 506 a transformer to that incoming edge.

Once the two models are constructed they are assessed by carrying out local optimization. Local optimization 508 of model one (or model two) comprises fixing the parameters of any previous part of the neural tree, computing a loss function describing the difference between the predicted labels given at the outputs of the leaf nodes of the models and the labels of the training examples, and adjusting the local parameters of the new modules according to gradient descent computed on the loss function.

The growth module then selects 512 between model one, or model two, or making no change. The selection is made using validation data, which is a sub-set of the training examples reserved for use in validation and which is not used for other parts of the training procedure. The validation data is processed using model one, model two and the existing neural tree with no change. The best performing option is selected which is the option giving predictions most similar to the labels of the validation data.

The neural tree is then updated 514 according to the selected option. For example, if model two is selected the neural tree is updated by increasing the depth of the incoming edge by adding a transformer with parameter values as computed from the local optimization process. If model one is selected the neural tree is updated by splitting the current node by adding a router module with parameters as computed from the local optimization process.

The growth module decides at check point 516 whether to end the growth process or not. The growth process ends if a threshold number of nodes is reached, or if convergence is reached or according to a combination of these and/or other factors. When the growth process ends the neural tree is stored 518 in the form of the topology (including the number of nodes, the modules and the arrangement of the nodes and modules) and parameter values of the modules. The stored neural tree 518 is then suitable for deployment and can be sent to other devices and/or the cloud. If the growth process is to continue the process returns to operation 502 of FIG. 5.

The rationale for evaluating the two models in the process of FIG. 5 is to give the process freedom to choose the most effective option between "going deeper" or partitioning the data space. Splitting a node is equivalent to a soft partitioning of the feature space of incoming data, and gives birth to two new leaf nodes (left and right children solvers). In this case, the added transformer modules on the two branches are identity function. Adding depth on the other hand does not change the number of leaf nodes, but instead seeks to learn richer representation via an extra nonlinear transformation, and replaces the old solver with a new one.

Using local optimization in the process of FIG. 5 saves time, memory and compute. Gradients only need to be computed for the parameters of the newly added peripheral parts of the architecture, reducing the amount of time and computation needed. Forward activations prior to the new parts do not need to be stored in memory, saving space.

Figure 6:
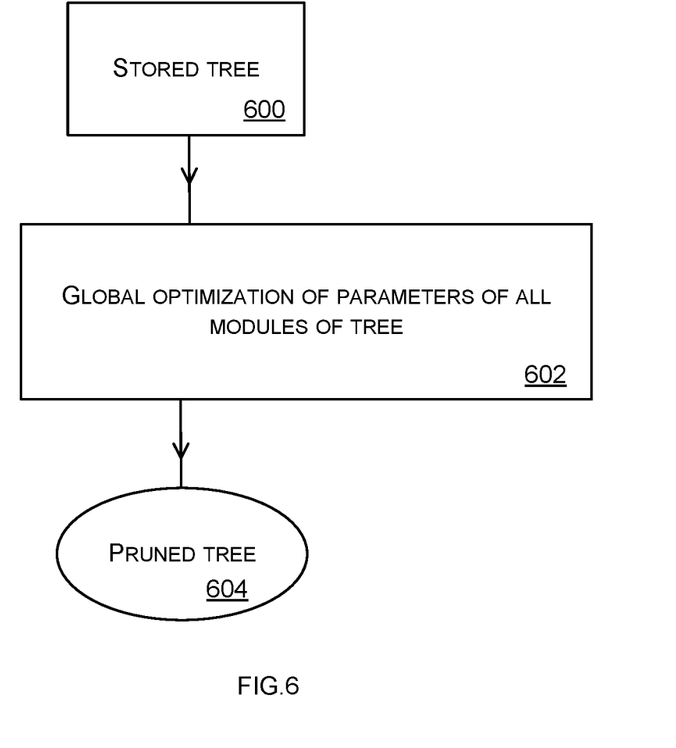
FIG. 6 is a flow diagram of a method of refining a neural tree.
Figure 7:
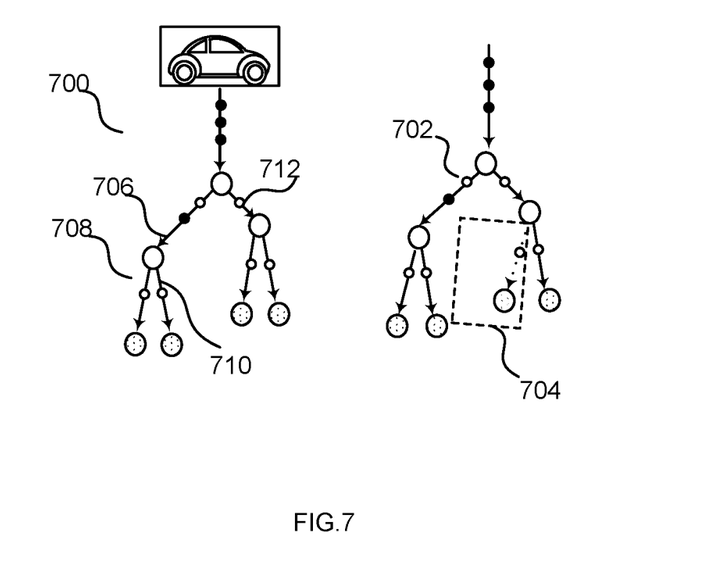
FIG. 7 is a schematic diagram of a neural tree before and after the refinement process of FIG. 6 is applied.

More detail about the refinement process is now given with reference to FIG. 6. Component 208 of FIG. 2 carries out the refinement process. A stored neural tree is accessed 600 such as a neural tree grown by the process of FIG. 5. A global optimization process 602 of parameters of all modules of the neural tree is then carried out and this results in a pruned neural tree 604 since redundant branches of the neural tree are effectively removed as a result of the global optimization as indicated in FIG. 7. Global optimization fine-tunes the parameters of all modules in the graph, jointly optimizing the hierarchical grouping of data to paths on the tree and the associated expert neural networks. The fine-tuning phase corrects suboptimal decision made during the local optimization of the growth phase, and empirically improves the generalization error.

FIG. 7 shows a neural tree 700 output from the growth process. It processes images of objects, such as an image of a car in the FIG. 7 example, in order to compute a prediction such as whether the object is liked by people in a particular age bracket. During the growth process the internal nodes and modules of the neural tree are grown and their parameters locally optimized. After global optimization the neural tree 700 becomes the neural tree 702 and it is seen that a branch of the neural tree 704 has been remove. The global optimization process calculated values of the parameters of the modules such that the branch 704 became redundant as is effectively pruned.

It is found in some cases that the neural tree is interpretable to some extent by humans which is not the case if only a neural network were used for the same task. In the example of FIG. 7, neural tree 700, it is found by inspection that the first level internal nodes act to divide the images into those depicting man-made objects along branch 706 and those depicting natural objects along branch 712. It is found that the branch 706 for man-made objects divides into images depicting (cars and trucks) along branch 708, and images depicting (planes and ships) along branch 710. Thus it is possible to interpret the path through the neural tree from the root node to a given leaf node and this enables humans to have some understanding of how a prediction computed by the neural tree is arrived at. In contrast, neural networks do not have this ability.

Once a neural tree is deployed it is used for test time processing as now described with reference to FIG. 8.

An input example is received 800 at the root node. The nature of the input example depends on the application domain. A non-exhaustive list of input examples is: image, image feature map derived from an image, video, audio signal, text segment, phonemes from a speech recognition pre-processing system, skeletal data produced by a system which estimates skeletal positions of humans or animals from images, sensor data, or data derived from sensor data. The input example has been processed by any transformer on the incoming edge to the root node. In an example, the transformer is a filter which acts to remove noise from the input example.

The transformed input example is processed 802 using the router module of the root node and as a result the left or right child node of the root node is selected. That is, a child of the current node is selected 804 using the router decision. The root node output is passed 806 to the selected child node via an outgoing edge of the root node. The output is transformed 808 using any transformer module(s) on the outgoing edge and a check is made 810 to see if a solver has been reached at a leaf node. If so, a prediction 814 is computed 812 by the solver 812 using the data input to the solver from the incoming edge. If no solver is reached at check 810 the results of the transformation are processed 816 by the router module at the current node, which is an internal node. The router module at the current node makes a decision 804 which is used to select a child of the router and the process repeats from operation 804.

Figure 8:
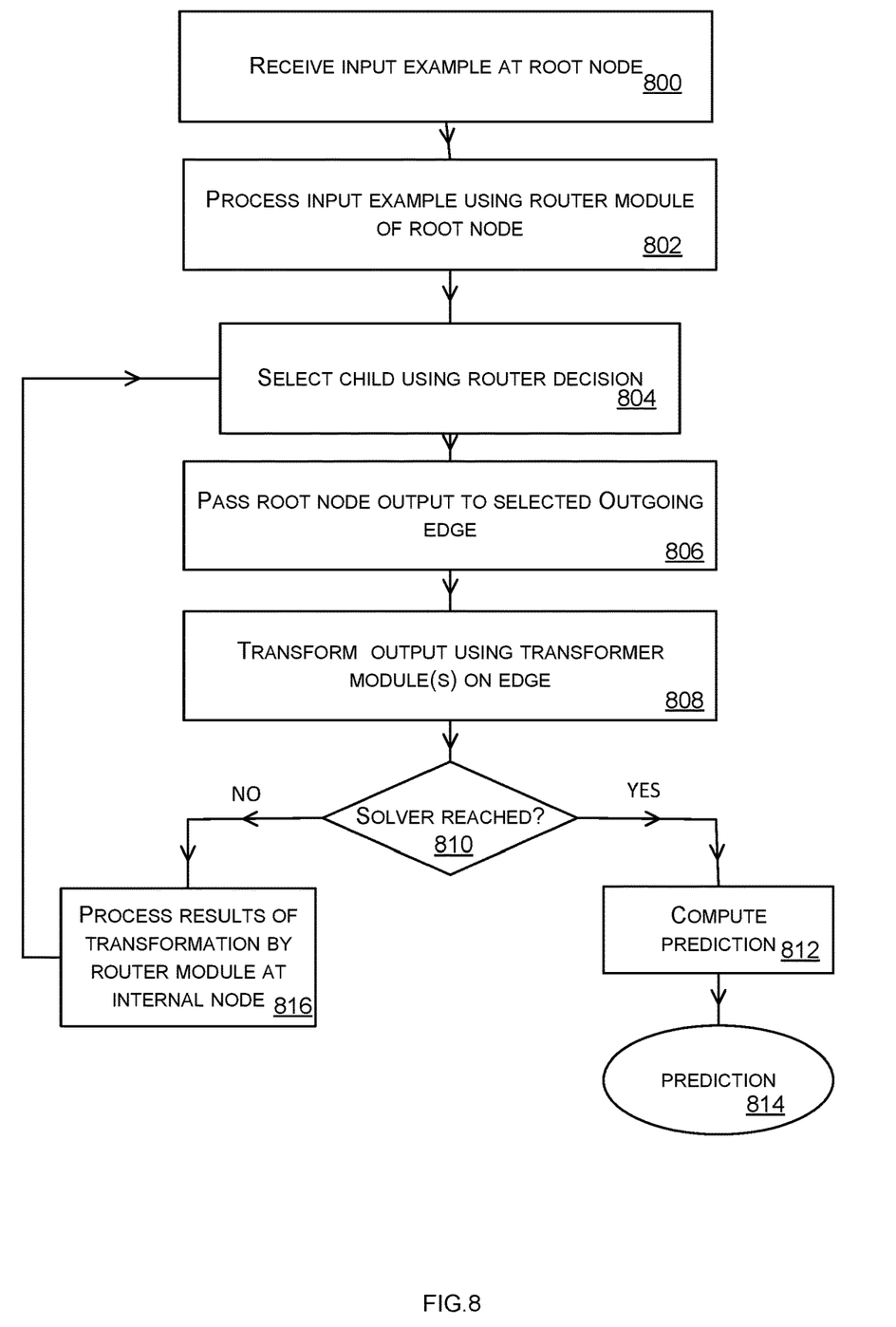
FIG. 8 is a flow diagram of a method of using a trained neural tree at test time to compute a prediction.

The test time inference process of FIG. 8 is efficient to compute as compared with a neural network and yet still gives highly accurate results. The reason for the efficiency is that the inference is computed along a path through the tree rather than for all nodes of the neural tree. In comparison, inference with a neural network involves making computations for all nodes of the neural network. The reason for the accuracy is that the modules associated with the edges and nodes have parameters with values that are learnt in training in a similar way to parameters of a neural network which are learnt during training. Because the modules along a path from the root node to a leaf node together form a neural network, the processing at test time inference gives highly accurate results. Because the test time inference process is efficient to compute it is practical to deploy and use neural trees on resource constrained devices such as smart phones, wearable computers and embedded devices.

Because a neural tree is used as opposed to a neural network the predictions computed by the neural tree are interpretable. This is beneficial where the technology is used to make automated decisions and it is desired to provide human users with a reasonable explanation of the logic involved in making the automated decision.

A probabilistic interpretation of the neural trees described in this document is now given and the neural trees are referred to as adaptive neural trees. An adaptive neural tree, ANT ($\mathbb{T}, \mathbb{O}$) models the conditional distribution p(y|x) as a hierarchical mixture of experts (HMEs) each of which corresponds to a particular root-to-leaf path in the tree. For input x, an ANT stochastically selects a path down to one of the leaf nodes l∈leaves($\mathcal{N}$), and generates a value for y from the corresponding neural network. Supposing we have L leaf nodes, the full predictive distribution is given by $$p(y \mid x, \psi, \phi, \Theta) = \sum_z p(y, z \mid x, \theta, \psi, \phi) = \sum_{l=1}^{L} p(z_l = 1 \mid x, \theta, \psi) \cdot p(y \mid x, z_l = 1, \phi, \psi)$$

where $z \in \{0,1\}^L$ is a L dimensional binary latent variable such that $\sum_{l=1}^{L} z_l = 1$, which describes the choice of leaf node (e.g. zl=1 means that leaf l is used). Here $\theta, \psi, \phi$ summarise the parameters of router, transformer and solver modules in the tree. The mixing coefficient $\pi_l^{\theta, \psi}(x) := p(z_l=1|x, \psi, \theta)$ quantifies the probability that x is assigned to leaf l and is given by a product of decision probabilities over all router modules on the unique path $\mathcal{R}_l$ from the root to leaf node l:

$$\pi_l^{\psi,\theta}(x) = \prod_{r_j^\theta \in R_l} r_j^\theta(x_j^\psi)^{1 \swarrow j} \cdot \left(1 - r_j^\theta(x_j^\psi)\right)^{1-1 \swarrow j} \quad (1)$$

where $l \swarrow j$ is a binary relation and is only true if leaf l is in the left-subtree of internal node j, and $x_j^\psi$ is the feature representation of x at node j. Suppose $T_j = \{t_{e_1}^\phi, \ldots, t_{e_{n(j)}}^\psi\}$ denotes the ordered set of transformer modules on the path from root to node j, the feature vector $x_j^\psi$ is given by $$x_j^\psi := \left(t_{e_{n(j)}^\psi} \circ \ldots \circ t_{e_2^\psi} \circ t_{e_1^\psi}\right)(x)$$

On the other hand, the leaf-specific conditional distribution $p_l^{\phi, \psi}(y) := p(y|x, z_l=1, \phi, \psi)$ in eq. (1) yields an estimate for the distribution over target y for the chosen expert leaf node l and is given by $s_l^\phi(x_{parent(l)}^\psi)$.

Two schemes of inference are considered, based on a trade-off between accuracy and computation. Firstly, the full predictive distribution given in eq. (1) is used as the estimate for the target conditional distribution p(y|x). However, averaging the distributions over all the leaves, weighted by their respective path probabilities, involves computing all operations at all of the nodes and edges of the tree, which makes inference expensive for a large ANT. We therefore consider a second scheme which uses the predictive distribution at the leaf node chosen by greedily traversing the tree in the directions of highest confidence of the routers. This approximation constrains computations to a single path, allowing for more memory- and time-efficient inference.

Training of an ANT proceeds in two stages: 1) growth phase during which the model progressively increases its complexity based on local optimization, and 2) fine-tuning phase which refines the parameters of the model discovered in the first phase based on global optimization.

In various examples, for both phases, the negative log-likelihood (NLL) is used as the common objective function, which is given by $$-\log p(Y \mid X), \theta, \psi, \phi) = -\sum_{n=1}^{N} \log\left(\sum_{l=1}^{L} \pi_l^{\theta,\psi}(x) p_l^{\phi,\psi}(y)\right)$$

Where $X=\{x^1, \ldots, x^{(N)}\}$, $Y=\{y^1, \ldots, y^{(N)}\}$ denote the training inputs and targets. As all component modules (routers, transformers and solvers) are differentiable with respect to their parameters $\Theta=(\theta, \psi, \phi)$, it is possible to use gradient-based optimization. Given an ANT with fixed topology, backpropagation is used for gradient computation and gradient descent is used to minimize the NLL for learning the parameters of the modules.

Various examples of neural trees according to the present technology are now described together with empirical data obtained from testing the neural trees.

Compact neural trees with high performance are discovered on the MNIST (LeCun et al., 1998) and CIFAR-10 (Krizhevsky & Hinton, 2009) datasets. The number of parameters in the router and transformer modules are balanced to be of the same order of magnitude to avoid favouring either partitioning the data or learning more expressive features.

Unless otherwise stated, the following training protocol is used in the empirical testing: (1) optimize parameters using Adam (Kingma & Ba, 2014) with initial learning rate of 10-3 and "=[0.9, 0.999], with minibatches of size 512; (2) during the growth phase, employ early stopping with a patience of 5, that is, training is stopped after 5 epochs of no progress on the validation set; (3) during the fine-tuning phase, train for 200 epochs, decreasing the learning rate by a factor of 10 after 100 and 150 epochs. For both MNIST and CIFAR-10, hold out 10% of training images as a validation set. The best model is selected based on the validation accuracy over the course of ANT training, spanning both the growth phase and the fine tuning step, and its accuracy on the testing set is reported. The hyperparameters are also selected on the validation performance, but not the test set.

For each ANT, classification is performed in two ways: using the full predictive distribution (eq. (1)) and a single greedily-selected leaf node.

Regarding the MNIST digit classification task, the dataset consists of 60, 000 train and 10, 000 test examples, all of which are 28×28 images of digits from 0 to 9 (10 classes). The data set is pre-processed by subtracting the mean, but no data augmentation is used.

ANTs are trained with a range of primitive modules and compared against relevant neural network and random forest (RF) models. For simplicity, consider primitive modules based on three types of neural network layers: convolutional, global-average-pooling (GAP) and fully-connected (FC). Solver modules are fixed as linear classifiers (LC) with a softmax output. Router modules are binary classifiers with a sigmoid output. All convolutional and FC layer are followed by ReLU, except in the last layers of solvers and routers. Also apply 2×2 max-pooling to feature maps after every two transformer modules.

The primitive modules used for the MNIST digit classification task and for the CIFAR10 task are set out in the table below. Row one of the table indicates that for the model called ANT-MNIST-A the routers comprise a single convolutional neural network layer using a 2D convolution with 40 kernels of spatial size 5 by 5, with global-average pooling (GAP) and with two fully connected layers (FC). The model called ANT-MNIST-A has transformers with a single convolutional neural network layer having a 2D convolution with 40 kernels of spatial size 5 by 5. The model called ANT-MNIST-A has solvers with a linear classifier (LC) and the frequency at which two by two max-pooling is applied is set to two Row two of the table indicates similar information regarding the primitive modules used for the ANT-MNIST-B model and so on for the other rows of the table.

| Model | Router | Transformer | Solver | Down-sample frequency |
|---|---|---|---|---|
| ANT-MNIST-A | 1x conv5-40 + GAP + 2xFC | 1 x conv5-40 | LC | 2 |
| ANT-MNIST-B | 1x conv3-40 + GAP + 2xFC | 1 x conv3-40 | LC | 2 |
| ANT-MNIST-C | 1x conv5-5 + GAP + 2xFC | 1 x conv5-5 | LC | 2 |
| ANT-CIFAR10-A | 2x conv3-128 + GAP + 1xFC | 2 x conv3-128 | LC | 1 |
| ANT-CIFAR10-B | 2x conv3-96 + GAP + 1xFC | 2 x conv3-48 | LC | 1 |
| ANT-CIFAR10-C | 2x conv3-48 + GAP + 1xFC | 2 x conv3-48 | GAP + LC | 1 |

It is found that ANT-MNIST-A outperforms the state-of-the-art RF methods in accuracy. This performance is attained despite the use of a single tree, while RF methods operate with ensembles of classifiers. Previous work uses a pre-specified architecture. ANT-MNIST-A on the other hand is automatically constructed from primitive modules, and displays an improvement over previous work in terms of accuracy and number of parameters. In addition, reducing the size of convolution kernels (ANT-MNIST-B) reduces the total number of parameters by 25% and the path-wise average by almost 40% while retaining performance.

Comparison is made against the LeNet-5 CNN, comprised of the same types of operations as is used in the present technology's primitive module specifications (i.e.

convolutional, max-pooling and FC layers). The network is trained with the same protocol as the fine-tuning phase of an ANT, and the error rate of 0.82% (lower than the reported value of 0.87%) was obtained on the test set. Both ANT-MNIST-A and ANT-MNIST-B attain better accuracy with a smaller number of parameters than LeNet-5, demonstrating again the potential of the proposed growth protocol for discovering compact models with high performance. Lastly, ANT-MNIST-C, with the simplest primitive modules, achieves an error rate of 1.68% with single-path inference, which is significantly better than that of the linear classifier (7.91%), while engaging almost the same number of parameters (7, 956 vs. 7, 840) on average.

Tests also evaluate the ANTs performance on CIFAR-10, which consists of 32×32 coloured natural images drawn from 10 classes. The train and test sets contains 50, 000 and 10, 000 images. An augmentation scheme is used whereby images are zero-padded with 4 pixels on each side, randomly cropped and horizontally mirrored.

Variants of ANTs with different types of module are compared against modern NN models. Comparisons are limited to NNs of up to 15 layers with the same set of operations and linear structures. All-CNN is selected as the baseline which reports the lowest error among the comparison targets and is the closest in terms of constituent operations (convolutional, GAP and FC layers). For a fair comparison, training is done in the same experimental set-up as the fine-tuning phase of ANT training, and the new performance is reported. Batch normalization is applied after every convolutional layer both in ANT modules, and All-CNN, as it improved convergence and accuracy. It was found that the growth protocol discovers an architecture (ANTCIFAR10-A) which attains lower error than All-CNN while retaining a similar number of parameters in total, and 20% less for path-wise inference. Simpler modules lead to more compact models (ANT-CIFAR10-B and C) with competitive performance with a marginal compromise in accuracy.

One strength of the methods described herein is the ability to adapt the model structure to the given availability of data and the complexity of the task. On the other hand, oversized models, trained in the standard way without regularization, are vulnerable to overfitting on small datasets. To confirm the benefits of the growth protocol, classification experiments are run on CIFAR-10 and three variants of ANTs are trained, the baseline All-CNN and linear classifier on subsets of the dataset of varying size. Models are given data sets of size 50, 250, 500, 2.5 k, 5 k, 25 k and 45 k (the full training set). The best model is picked based on the performance on the same validation set of 5 k examples as before. As the dataset gets smaller, the margin between the test accuracy of the ANT models and All-CNN/linear classifier increases (up to 13%). It can be observed that for different settings of primitive modules, the number of parameters generally increases as a function of the dataset size. All-CNN has a fixed number of parameters, consistently larger than the discovered ANTs, and suffers from overfitting, particularly on small datasets. The linear classifier, on the otherhand, underfits to the data. The methods of the present technology construct networks of adequate complexity, leading to better generalisation.

The proposed training procedure in the growth phase of ANTs is capable of discovering hierarchical structures in the data that are useful to the end task. Learned hierarchies often display strong specialisation of paths to certain classes or categories of data on both the MNIST and CIFAR-10 datasets.

The global fine-tuning step improves the generalisation error. While the models initially undergo a steep drop in performance, they all consistently converge to higher test accuracy than the best value attained during the growth phase. This provides evidence that global optimisation remedies suboptimal decisions made during the locally optimised growth phase. For example, fine-tuning tends to polarize the decisions of routers, which occasionally leads to the pruning of some branches, and improves generalisation, displaying resolvement of suboptimal partitioning of data.

Various examples described herein comprise ANTs, a form of decision trees (DTs) which use neural networks in both its edges and nodes, combining the abilities of representation learning with hierarchical data partitioning. A training algorithm optimises both the parameters and architectures of ANTs through progressive growth, tuning them to the size and complexity of the training dataset.

Figure 9:
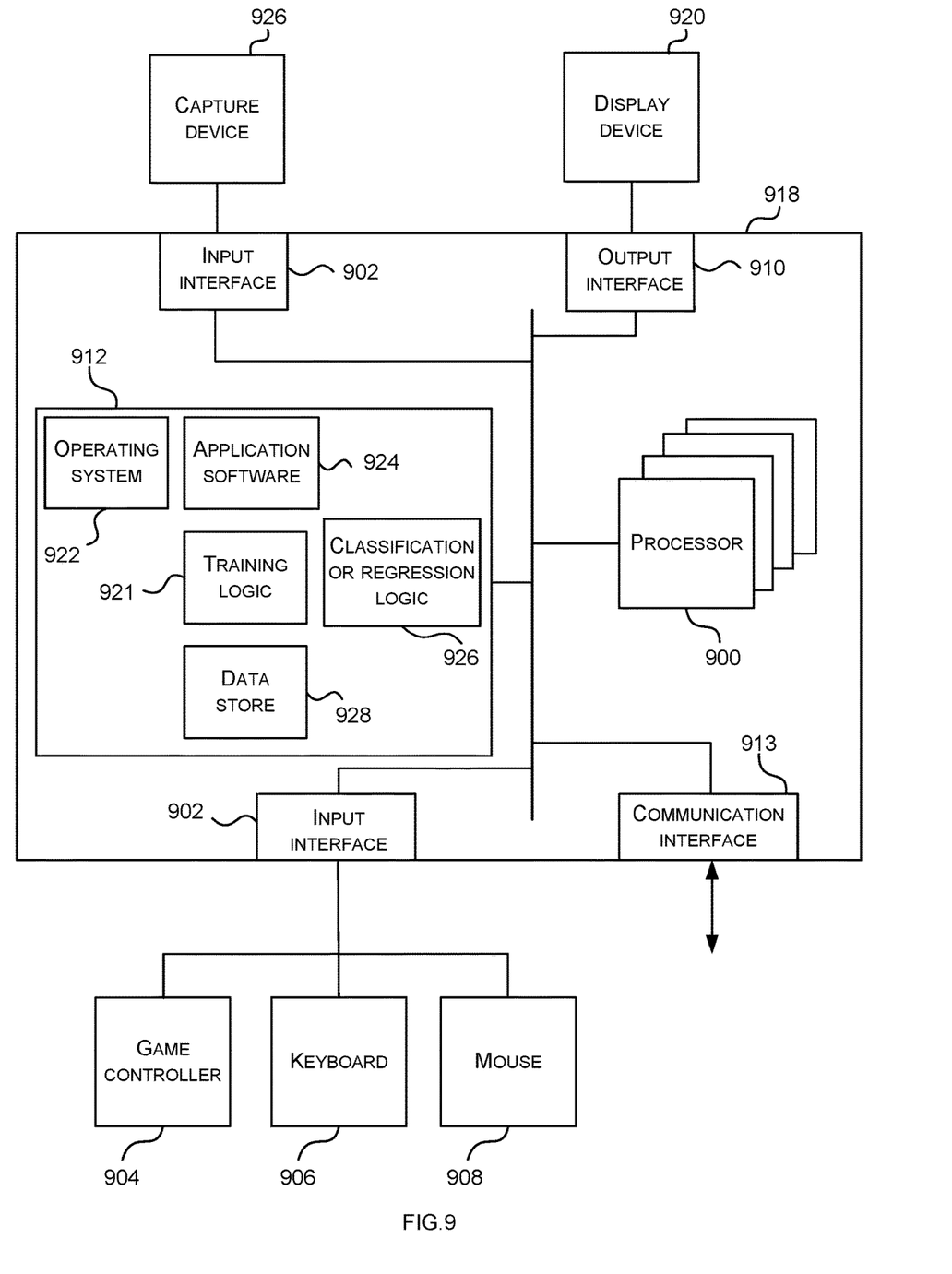
FIG. 9 illustrates an exemplary computing-based device in which embodiments of a neural tree are implemented.

FIG. 9 illustrates various components of an exemplary computing-based device 918 which are implemented as any form of a computing and/or electronic device, and in which embodiments of a predictor using at least one neural tree is implemented in some examples.

Computing-based device 918 comprises one or more processors 900 which are microprocessors, controllers or any other suitable type of processors for processing computer executable instructions to control the operation of the device in order to train neural trees and/or use neural trees for classification or regression tasks applied to input examples such as images or other types of input examples. In some examples, for example where a system on a chip architecture is used, the processors 900 include one or more fixed function blocks (also referred to as accelerators) which implement a part of the method of training a neural tree and/or computing predictions in hardware (rather than software or firmware). Platform software comprising an operating system 922 or any other suitable platform software is provided at the computing-based device to enable application software 924 to be executed on the device. A training logic 921 is arranged to train one or more neural trees. A data store 928 holds training examples, training objectives, parameter values, neural trees, or other data. A classification or regression logic 926 is arranged to use trained neural trees to carry out regression or classification tasks with respect to images or other examples.

The computer executable instructions are provided using any computer-readable media that is accessible by computing based device 918. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 918 it will be appreciated that the storage is, in some examples, distributed or located remotely and accessed via a network or other communication link (e.g. using communication interface 913).

The computing-based device 918 also comprises an input/output controller comprising input interface 902 and output interface 910. Output interface 910 is arranged to output display information to a display device 920 which may be separate from or integral to the computing-based device 918. The display information may provide a graphical user interface. The input/output controller is also arranged to receive and process input from one or more devices, such as a user input device 904, 906, 908 (e.g. a mouse, keyboard, camera, microphone or other sensor) or capture device 926 such as a camera, microphone or other sensor. In some examples the user input device detects voice input, user gestures or other user actions and provides a natural user interface (NUI). This user input may be used to specify training objectives, set parameter values, input training data or for other purposes. In an embodiment the display device 920 also acts as the user input device if it is a touch sensitive display device. The input/output controller outputs data to devices other than the display device in some examples, e.g. a locally connected printing device.

Any of the input/output controller 902, 910, display device 920 and the user input device 904, 906, 908 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following clauses:

Clause 1. A predictor for predicting an outcome y given an example x, comprising:
 a memory which stores at least one example x for which an outcome y is not known;
 a memory storing at least one decision tree comprising a plurality of nodes connected by edges, the nodes comprising a root node, internal nodes and leaf nodes;
 wherein, individual ones of the nodes and individual ones of the edges each have an assigned module, comprising parameterized, differentiable operations, such that for each of the internal nodes the module computes a binary outcome for selecting a child node of the internal node;
 a processor configured to compute the prediction y by processing the example x using a plurality of the differentiable operations selected according to a path through the tree from the root node to a leaf node. By using parameterized differentiable operations on edges as well as on nodes the resulting architecture gives a machine learning system which computes accurate predictions whilst at the same time being interpretable.

Clause 2. The predictor of clause 1 wherein the assigned modules along the path form a neural network. In this way the ability of neural networks to compute accurate predictions is exploited in a controlled way for the individual paths. Optionally the example x is any of: an image, image feature map derived from an image, video, audio signal, text segment, phonemes from a speech recognition pre-processing system, skeletal data produced by a system which estimates skeletal positions of humans or animals from images, sensor data, data derived from sensor data.

Clause 3. The predictor of clause 1 wherein the assigned modules which are assigned to internal nodes of the decision tree are routers configured to compute a binary decision in a stochastic manner according to characteristics of the processed example, and wherein the example x is any of: an image, image feature map derived from an image, video, audio signal, text segment, phonemes from a speech recognition pre-processing system, skeletal data produced by a system which estimates skeletal positions of humans or animals from images, sensor data, data derived from sensor data. In this way the routers are able to control flow of data through the decision tree and, since the routers have parameters, values of the parameters are updatable during training.

Clause 4. The predictor of clause 3 wherein at least one of the routers comprises a processor for computing the binary decision according to samples from a probability distribution with a mean corresponding to a current input to the decision tree. This provides a practical and effective way to route data through the decision tree.

Clause 5. The predictor of clause 1 wherein the assigned modules which are assigned to leaf nodes of the decision tree are solvers configured to operate on transformed input data received at the solver and to output an estimate of a conditional distribution expressing the probability of the outcome y given the example x wherein the example x is any of: an image, image feature map derived from an image, video, audio signal, text segment, phonemes from a speech recognition pre-processing system, skeletal data produced by a system which estimates skeletal positions of humans or animals from images, sensor data, data derived from sensor data. In this way the solvers give an output which is useful for downstream applications such as medical image processing apparatus, audio signal processing apparatus, gesture detection apparatus and others.

Clause 6. The predictor of clause 1 wherein the assigned modules which are assigned to edges of the decision tree are transformers, each transformer configured to compute a non-linear function of an example or a processed example reaching the edge from a parent node, and wherein the example is any of: an image, image feature map derived from an image, video, audio signal, text segment, phonemes from a speech recognition pre-processing system, skeletal data produced by a system which estimates skeletal positions of humans or animals from images, sensor data, data derived from sensor data. Having transformers which compute non-linear functions on the edges enables paths through the tree to include non-linear functions which transform the data into forms useful for later processing in the tree. Because the transformers are parameterized the values of the parameters are learnable in training.

Clause 7. The predictor of clause 6 wherein at least one of the transformers is a single convolutional layer of a neural network followed by a rectified linear unit. By using a single convolutional layer a small part of a neural network is used and together with other edges and nodes in a path through the tree the single convolutional layer is able to form a larger neural network. By using a single convolutional layer processing and storage needs are kept low.

Clause 8. The predictor of clause 1 having been formed using a growing process which is dependent on a set of training data used to train the predictor and wherein the training data comprises any of: an image, image feature map derived from an image, video, audio signal, text segment, phonemes from a speech recognition pre-processing system, skeletal data produced by a system which estimates skeletal positions of humans or animals from images, sensor data, data derived from sensor data. Using a growing process in this way enables the machine learning system to have an architecture which is bespoke to the application domain and training data. Bespoke architectures are typically smaller than counterpart generalist architectures and this saves on storage and on processing requirements.

Clause 9. The predictor of clause 1 wherein the outcome is a class label and the example is a voxel of a medical image, and wherein the predictor is used for medical image analysis. A class label is a mark which distinguishes between a plurality of possible groups. A voxel is a three dimensional unit of a medical image volume such as a computed tomography (CT) image or an magnetic resonance imaging (MRI) image.

Clause 10. The predictor of clause 9 wherein the assigned modules which are assigned to edges of the decision tree are transformers, each transformer configured to compute a non-linear function which acts to filter the medical image, and where a plurality of different transformers are used. Using filters enables different structures depicted in medical images such as bone, watery tissue structures, tumors and other structures to be better represented so that results are more accurate.

Clause 11. A computer-implemented method of training a predictor to predict an outcome y given an example x, the method comprising:
  storing in a memory a plurality of training examples comprising examples x for which outcomes y are known;
  accessing from the memory at least one decision tree comprising a plurality of nodes connected by edges, the nodes comprising a root node, internal nodes and leaf nodes;
  wherein individual ones of the nodes and individual ones of the edges each have an assigned module comprising parameterized, differentiable operations, such that for each of the internal nodes the module computes a binary outcome for selecting a child node of the internal node;
  a processor configured to grow the decision tree by, for a current node in a layer of the tree furthest from the root node, deciding whether to: add another module to the incoming edge of the current node, add another node to the current node, or terminate growing for the current node; wherein the decision is made by using a validation set of the training examples.

Clause 12. The computer-implemented method of clause 11 wherein making the decision comprises constructing a first model by simulating splitting of the current node by adding a router module, and constructing a second model by simulating increasing the depth of an incoming edge of the current node by adding a transformer module and wherein the training examples comprise any of: an image, image feature map derived from an image, video, audio signal, text segment, phonemes from a speech recognition pre-processing system, skeletal data produced by a system which estimates skeletal positions of humans or animals from images, sensor data, data derived from sensor data. Simulating the two models enables assessment of the options before implementing the selected option in the decision tree.

Clause 13. The method of clause 12 comprising making the decision by, fixing the parameters of the decision tree in the first and second models, except for the parameters of modules added in the simulation, and computing a local optimization using the training data to adjust the non-fixed parameters. By fixing parameters and computing local optimization a practical working solution is achieved which is able to scale up.

Clause 14. The method of clause 13 comprising making the decision by assessing the performance of: the first model, the second model, and the decision tree before any changes, using the validation training examples and selecting according to a most accurate one of these options. Using the validation training examples to make the assessment of performance is found to be an effective solution which is practical to implement.

Clause 15. The method of clause 11 further comprising refining the decision tree by computing a global optimization over parameters of the modules using the training examples and wherein the training examples comprise any of: an image, image feature map derived from an image, video, audio signal, text segment, phonemes from a speech recognition pre-processing system, skeletal data produced by a system which estimates skeletal positions of humans or animals from images, sensor data, data derived from sensor data. The optional global optimization is good for improving performance and reducing size of the decision tree so that it is suitable for deployment on resource constrained devices.

Clause 16. The method of clause 15 wherein the global optimization jointly optimizes a hierarchical grouping of data to paths on the decision tree and neural networks associated with those paths.

Clause 17. A predictor, comprising:
  a memory which stores at least one example x for which an outcome y is not known;
  a memory storing at least one decision tree comprising a plurality of nodes connected by edges, the nodes comprising a root node, internal nodes and leaf nodes;
  wherein, individual ones of the nodes and individual ones of the edges each have an assigned module, comprising parameterized, differentiable operations, such that for each of the internal nodes the module computes a binary outcome for selecting a child node of the internal node;
  a processor configured to compute the prediction y by processing the example x using a plurality of the differentiable operations selected according to a path through the tree from the root node to a leaf node; and wherein the decision tree has been formed using a growing process which is dependent on a set of training data comprising examples x for which outcomes y are known.

Clause 18. The predictor of clause 17 wherein the examples comprise medical image data and the outcomes are class labels.

Clause 19. The predictor of clause 18 wherein the assigned modules on the individual ones of the edges are non-linear filters which act to filter the medical image.

Clause 20. The predictor of clause 19 wherein there are a plurality of different non-linear filters on individual ones of the edges.

Clause 21. A predictor for predicting a class label, from a plurality of possible class labels, of a voxel of a medical image, the predictor comprising:
   a memory which stores at least one voxel of the medical image for which a class label is not known;
   a memory storing at least one decision tree comprising a plurality of nodes connected by edges, the nodes comprising a root node, internal nodes and leaf nodes;
   wherein, individual ones of the nodes and individual ones of the edges each have an assigned module, comprising parameterized, differentiable operations, such that for each of the internal nodes the module computes a binary outcome for selecting a child node of the internal node;
   a processor configured to compute a prediction of the class label which is not known by processing the medical image using a plurality of the differentiable operations selected according to a path through the tree from the root node to a leaf node.

Clause 22. A computer-implemented method of training a predictor to predict a label, from a plurality of possible labels, of an image element given the image, the method comprising:
   storing in a memory a plurality of training examples comprising image elements for which labels are known;
   accessing from the memory at least one decision tree comprising a plurality of nodes connected by edges, the nodes comprising a root node, internal nodes and leaf nodes;
   wherein individual ones of the nodes and individual ones of the edges each have an assigned module comprising parameterized, differentiable operations, such that for each of the internal nodes the module computes a binary outcome for selecting a child node of the internal node;
   a processor configured to grow the decision tree by, for a current node in a layer of the tree furthest from the root node, deciding whether to: add another module to the incoming edge of the current node, add another node to the current node, or terminate growing for the current node; wherein the decision is made by using a validation set of the training examples;
   the processor configured to compute a prediction of the label by processing the image using a plurality of the differentiable operations selected according to a path through the tree from the root node to a leaf node.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A system comprising:
a memory storing instructions;
a processor configured to execute the instructions stored in the memory to:
create nodes connected by edges at least by computing parameterized, differential operations;
construct, in parallel:
a first model via a growing process dependent on training data; and
a second model by increasing a depth of an incoming edge of at least one of the nodes;
remove at least one of the nodes based on comparing values of the differentiable operations with validation data, resulting in a pruned decision tree; and
apply the pruned decision tree to an input example resulting in a predicted output.

2. The system of claim 1, wherein the input example is an audio signal, and wherein applying the pruned decision tree comprises predicting a label of an object in the audio signal.

3. The system of claim 1, wherein the input example is a video file, and wherein applying the pruned decision tree comprises predicting a label of an object in the video file.

4. The system of claim 1, wherein the input example is a text segment, and wherein applying the pruned decision tree comprises predicting a label of an object in the text segment.

5. The system of claim 1, wherein the input example is a phoneme from a speech recognition pre-processing system, and wherein applying the pruned decision tree comprises predicting a label of an object in the speech recognition pre-processing system.

6. The system of claim 1, wherein the input example is a skeletal data, and wherein applying the pruned decision tree comprises predicting a label of an object in the skeletal data.

7. The system of claim 6, wherein the skeletal data includes estimated skeletal positions of a human or an animal in an image.

8. The system of claim 1, wherein the input example is sensor data, and wherein applying the pruned decision tree comprises predicting a label of an object in the sensor data.

9. The system of claim 1, wherein the input example is data derived from sensor data, and wherein applying the pruned decision tree comprises predicting a label of an object in the data.

10. The system of claim 1, wherein the input example is an image feature map derived from an image, and wherein applying the pruned decision tree comprises predicting a label of an object in the image feature map.

11. The system of claim 1, wherein the processor is configured to execute the instructions stored in the memory to:
remove, by a transformer on at least one of the edges, noise from the input example.

12. A computer-implemented method comprising:
creating nodes connected by edges at least by computing parameterized, differential operations;
constructing, in parallel:
a first model via a growing process dependent on training data; and
a second model by increasing a depth of an incoming edge of at least one of the nodes;
removing at least one of the nodes based on comparing values of the differentiable operations with validation data, resulting in a pruned decision tree; and
applying the pruned decision tree to an input example resulting in a predicted output.

13. The computer-implemented method of claim 12, wherein the input example is an audio signal, and wherein applying the pruned decision tree comprises predicting a label of an object in the audio signal.

14. The computer-implemented method of claim 12, wherein the input example is a video file, and wherein applying the pruned decision tree comprises predicting a label of an object in the video file.

15. The computer-implemented method of claim 12, wherein the input example is a text segment, and wherein applying the pruned decision tree comprises predicting a label of an object in the text segment.

16. The computer-implemented method of claim 12, wherein the input example is a phoneme from a speech recognition pre-processing system, and wherein applying the pruned decision tree comprises predicting a label of an object in the speech recognition pre-processing system.

17. The computer-implemented method of claim 12, wherein the input example is a skeletal data, wherein applying the pruned decision tree comprising predicting a label of an object in the skeletal data, and wherein the skeletal data is estimated skeletal positions of a human or an animal in an image.

18. The computer-implemented method of claim 12, wherein the input example is sensor data, and wherein applying the pruned decision tree comprises predicting a label of an object in the sensor data.

19. The computer-implemented method of claim 12, wherein the input example is data derived from sensor data, and wherein applying the pruned decision tree comprises predicting a label of an object in the data.

20. A server comprising:
a memory storing instructions;
a processor configured to execute the instructions stored in the memory to:
create nodes connected by edges at least by computing parameterized, differential operations;
construct, in parallel:
a first model via a growing process dependent on training data; and
a second model by increasing a depth of an incoming edge of at least one of the nodes;
remove at least one of the nodes based on comparing values of the differentiable operations with validation data, resulting in a pruned decision tree; and
apply the pruned decision tree to an input example resulting in a predicted output.

* * * * *